United States Patent

Meier-Burkamp

[11] Patent Number: 5,527,230
[45] Date of Patent: Jun. 18, 1996

[54] MULTI-SPEED HUB FOR BICYCLES

[75] Inventor: Gerhard Meier-Burkamp, Bergrheinfeld, Germany

[73] Assignee: Fichtel & Sachs AG, Schweinfurt, Germany

[21] Appl. No.: 351,763

[22] Filed: Dec. 8, 1994

[30] Foreign Application Priority Data

Dec. 11, 1993 [DE] Germany ............... 43 42 347.7

[51] Int. Cl.$^6$ .................................................. F16H 3/62
[52] U.S. Cl. ..................... 475/275; 475/285; 475/298; 475/339
[58] Field of Search ................... 475/275, 284, 475/285, 298, 300, 338, 339, 340; 192/6 A

[56] References Cited

U.S. PATENT DOCUMENTS

| | | | |
|---|---|---|---|
| 4,651,853 | 3/1987 | Bergles | 192/6 A |
| 4,721,013 | 1/1988 | Steuer et al. | 475/289 |
| 4,727,965 | 3/1988 | Zach et al. | 192/6 A |
| 4,842,291 | 6/1989 | Hartmann | 280/238 |
| 4,973,297 | 11/1990 | Bergles | 475/300 X |
| 5,273,500 | 12/1993 | Nagano . | |
| 5,399,128 | 3/1995 | Nürnberger | 475/298 |
| 5,443,279 | 8/1995 | Nürnberger | 475/289 X |
| 5,445,573 | 8/1995 | Nürnberger | 475/298 |

FOREIGN PATENT DOCUMENTS

4142867 7/1992 Germany .

*Primary Examiner*—Charles A. Marmor
*Assistant Examiner*—Peter Kwon
*Attorney, Agent, or Firm*—Nils H. Ljungman & Associates

[57] ABSTRACT

A multi-speed drive hub for bicycles, with or without a back-pedal brake, can have a hub shift transmission which has a first, and second, and a differential planetary gear set. A differential ring gear which belongs to the differential planetary gear set, can be connected to a hub sleeve by means of a clutch device which acts in one direction of rotation. Depending on the speed of rotation of the first and second ring gear of the first and second planetary gear set, the differential sun wheel and the second planetary carrier of the differential planetary gear set are rotated at different speeds of rotation, whereby either the differential sun wheel or the second planetary carrier of the differential planetary gear set runs faster, as a result of which the multiplicity of speeds which results from the alternating stopping of the sun wheels of the first and second planetary gear set on the hub axle on the first and second ring gear is transmitted from the first and second planetary gear sets into the differential planetary gear set. The advantage of such hub shift transmissions is that it is possible to realize a multi-speed hub with gear spreads which can be arbitrarily modified by design and construction measures.

9 Claims, 6 Drawing Sheets

MULTI-SPEED HUB FOR BICYCLES

BACKGROUND OF THE INVENTION

1. Field of the Invention.

The present invention generally relates to a multi-speed hub for the driven wheels of bicycles and similar vehicles. Such a multi-speed drive hub can generally have a hub axle which can be non-rotationally attached to a bicycle frame, a driver device rotationally mounted on the hub axle, a hub sleeve which can be concentric to the hub axle and mounted on the driver, and a hub shift transmission acting between the drive and the hub sleeve. For providing the multiple gear ratios of the hub, the hub shift transmission can have first and second planetary gear sets, each having at least one stage. To provide the first and second planetary gearsets, there can preferably be a first planetary carrier mounted rotationally on the hub axle, with first and second multi-stage planet wheels mounted rotationally on the first planetary carrier. There can also be corresponding sets of first and second sun wheels, corresponding to, and being engaged with each of the individual stages of the first and second multi-stage planet wheels. The first and second sun wheels are rotationally mounted on the hub axle, and can be optionally non-rotationally connected to the hub axle in any respective axial connection position by means of corresponding freewheels.

In addition, there can be a first ring gear engaged with one of the stages of the first multi-stage planet wheel, and a second ring gear engaged with one of the stages of the second planet wheel, wherein the ring gears provide the output from the planetary gearsets.

2. Background Information

A hub with the capability of generating a number of speeds by means of two planetary gear sets located next to one another is disclosed in German Patent Application No. 41 42 867, which corresponds to U.S. Pat. No. 5,273,500. In this hub, a ring gear of a first planetary gear set is actively connected via a coupling system, acting in one direction of rotation, to the hub sleeve. The gear ratio achieved in a second planetary gear set is transferred to the first planetary gear set via an output, or driven second planetary carrier, and is superimposed on the gear ratio of the first planetary gear set. The system of the first and second planetary gear sets, in this sense, can essentially be considered to be a transmission with a gear reducer unit. Such an arrangement, however, does not provide the maximum number of gear ratios per number of available gear stages of the planetary gears.

OBJECT OF THE INVENTION

It is therefore the object of the current invention to create a hub which simply and inexpensively generates a multiplicity of speeds with sufficient spread of gear ratios for each application of hub gears in a bicycle.

SUMMARY OF THE INVENTION

The present invention teaches that this object can be accomplished by means of a hub shift transmission in which a third, differential planetary gear set with at least one stage is also located inside the hub sleeve, wherein the first ring gear of the first gearset provides a second planetary carrier of the third gearset, the second ring gear of the second gearset provides either the differential sun wheel or the differential ring gear of the third gearset, and the other of the differential ring gear and the differential sun gear of the third gearset then drives the hub sleeve.

Thus, in contrast to the known arrangement as discussed above, the multi-speed hub, in accordance with the present invention, preferably has first and second planetary gear systems which should essentially be considered equal with respect to the generation of speeds producing the gear ratio for each of two speed inputs of a third planetary gear system. This third planetary gear system essentially functions as a differential transmission, which means that this third planetary gear system can transmit, via its third ring gear, the speed of the first ring gear of the first planetary gear system and the speed of the second ring gear of the second planetary gear system to the hub sleeve in such a manner that either the sun wheel of the third planetary gear set rotates faster than the second planetary carrier, which second planetary carrier is non-rotationally coupled to the first ring gear, or vice-versa.

A multi-speed hub designed with such a configuration can thus have a number of speeds which can be transmitted to the hub sleeve via the third planetary gear set, which preferably functions as a differential gear, in essentially any desired spread of gear ratios as a function of the application of the hub.

In addition to the above, clutch devices can preferably be provided which act in one speed and next to each of which a planetary gear set can be located. Such clutch devices have proven to be of particular advantage. In the configuration in accordance with the present invention, a first clutch device can be provided to connect the first common planetary carrier to the first ring gear, and a second clutch device can be provided to connect the first planetary carrier to the second ring gear. In the case of a special shifting system, a direct speed can then essentially be produced by means of at least one of these two clutch devices. However, of greater interest is the possibility of providing each planetary gear set with an additional speed with each of these two clutch devices. Thus, in essence, a planetary gearset with three stages can essentially provide four different speeds, etc.

Additional embodiments and advantages of the present invention will be provided further herebelow with reference to the accompanying figures. It should be understood that when the word "invention" is used in this application, the word "invention" includes "inventions", that is, the plural of "invention". By stating "invention", Applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a multi-speed hub for a bicycle, the hub comprising: shaft apparatus for being non-rotationally connected to a frame of a bicycle; input apparatus for inputting rotational power to the hub; sleeve apparatus disposed concentrically about the shaft apparatus for outputting rotational power from the hub, the sleeve apparatus comprising apparatus for being connected to a wheel of a bicycle; transmission apparatus disposed within the sleeve apparatus about the shaft apparatus, the transmission apparatus comprising apparatus for receiving the input rotational power of the input apparatus and outputting the rotational power to the sleeve apparatus; the transmission apparatus comprising: first and second planetary gear mechanisms for receiving rotational input from the input apparatus; the first planetary gear mechanism comprising: an input portion for being rotatably driven about the shaft apparatus by the input apparatus; an output portion for being driven by the input portion and for receiving the rotational power from the input portion and outputting the rotational power; and interconnecting apparatus interconnecting the input portion and the output portion to transfer rotational power from the input portion to the output portion; the second planetary gear mechanism comprising: an input portion for being rotatably driven about the shaft apparatus by the input apparatus; an output portion for being driven by the input portion and for receiving the rotational power from the input portion and outputting the rotational power; and interconnecting apparatus interconnecting the input portion and the output portion to transfer rotational power from the input portion to the output portion; a third planetary gear mechanism for receiving the output rotational power from the output portion of each of the first and second planetary gear mechanisms; the third planetary gear mechanism comprising: a first input portion for receiving the output rotational power from the output portion of the first planetary gear mechanism; a second input portion for receiving the output rotational power from the output portion of the second planetary gear mechanism; an output portion for receiving rotational power from the first and second input portions and outputting rotational power to the sleeve apparatus; interconnecting apparatus interconnecting the output portion with both the first input portion and the second input portion to transfer rotational power from the both the first and second input portions to the output portion; the interconnecting apparatus of at least one of the first, second and third planetary gear mechanisms comprising apparatus for varying a ratio of rotational power input to rotational power output; and the hub further comprises apparatus for selectively switching the apparatus for varying to vary the ratio of rotational power input to rotational power output.

Another aspect of the invention resides broadly in a method for mass-producing twelve-speed hubs for bicycles and mass assemblying bicycles having twelve speed hubs, the twelve speed hubs each comprising: shaft apparatus for being non-rotationally connected to a frame of a bicycle; main input apparatus for inputting rotational power to the hub; sleeve apparatus disposed concentrically about the shaft apparatus for outputting rotational power from the hub, the sleeve apparatus comprising apparatus for being connected to a wheel of a bicycle; transmission apparatus disposed within the hub sleeve about the shaft apparatus, the transmission apparatus comprising apparatus for receiving the input rotational power of the main input apparatus and outputting the rotational power to the sleeve apparatus; the transmission apparatus comprising first, second and third planetary gear mechanisms for receiving rotational power from the main input apparatus and outputting rotational power to the sleeve apparatus; the first planetary gear mechanism comprising: first input apparatus for receiving rotational power from the main input apparatus, first output apparatus for outputting rotational power, four selectable gear ratios between the first input apparatus and the first output apparatus, and apparatus for selectively choosing one of the four selectable gear ratios; the second planetary gear mechanism comprising: second input apparatus for receiving rotational power from the main input apparatus, second output apparatus for outputting rotational power, three selectable gear ratios between the second input apparatus and the second output apparatus, and apparatus for selectively choosing one of the three selectable gear ratios; and the third planetary gear mechanism comprising: third input apparatus for receiving rotational power from the first output apparatus, fourth input apparatus for receiving rotational power from the second output apparatus, third output apparatus for outputting rotational power to the sleeve apparatus, and gear apparatus interconnecting the the third and fourth input apparatus and the third output apparatus; and the method for mass-producing hubs comprising the steps of: providing a plurality of the shaft apparatus; providing a plurality of the sleeve apparatus; providing a plurality of the main input apparatus; providing a plurality of the transmission apparatus; the providing a plurality of the transmission apparatus comprising, for each the hub, the steps of: providing the first planetary gear mechanism having the four selectable gear ratios; disposing the first planetary gear mechanism about the axle; connecting the first input apparatus of the first planetary gear mechanism to the main input apparatus; providing the second planetary gear mechanism having the three selectable gear ratios; disposing the second planetary gear mechanism about the axle; connecting the second input apparatus of the second planetary gear mechanism to the main input apparatus; providing the third planetary gear mechanism; disposing the third planetary gear mechanism about the axle; connecting the third input apparatus of the third planetary gear mechanism to the first output apparatus of the first planetary gear mechanism; and connecting the fourth input apparatus of the third planetary gear mechanism to the second output apparatus of the second planetary gear mechanism; mass-assembling one the sleeve apparatus concentrically about each the transmission apparatus; mass assembling the third output apparatus of the third planetary gear mechanism with the sleeve apparatus to form assembled hubs; providing a plurality of wheel rim apparatus; mass assembling one wheel rim apparatus to each the sleeve apparatus of each assembled hub; providing a plurality of bicycle frames; mass assembling one assembled hub to each the bicycle frame by connecting the shaft apparatus to the bicycle frame; providing a plurality of the apparatus for selectively choosing ones of the gear ratios; and mass assembling at least one of the apparatus for selectively choosing to each the bicycle frame.

BRIEF DESCRIPTION OF THE DRAWINGS

The present invention is described in greater detail below with reference to the schematic drawings of a number of configurations of a hub shift transmission of a multi-speed hub, in which.

DESCRIPTION OF THE PREFERRED EMBODIMENTS

Figure 3:
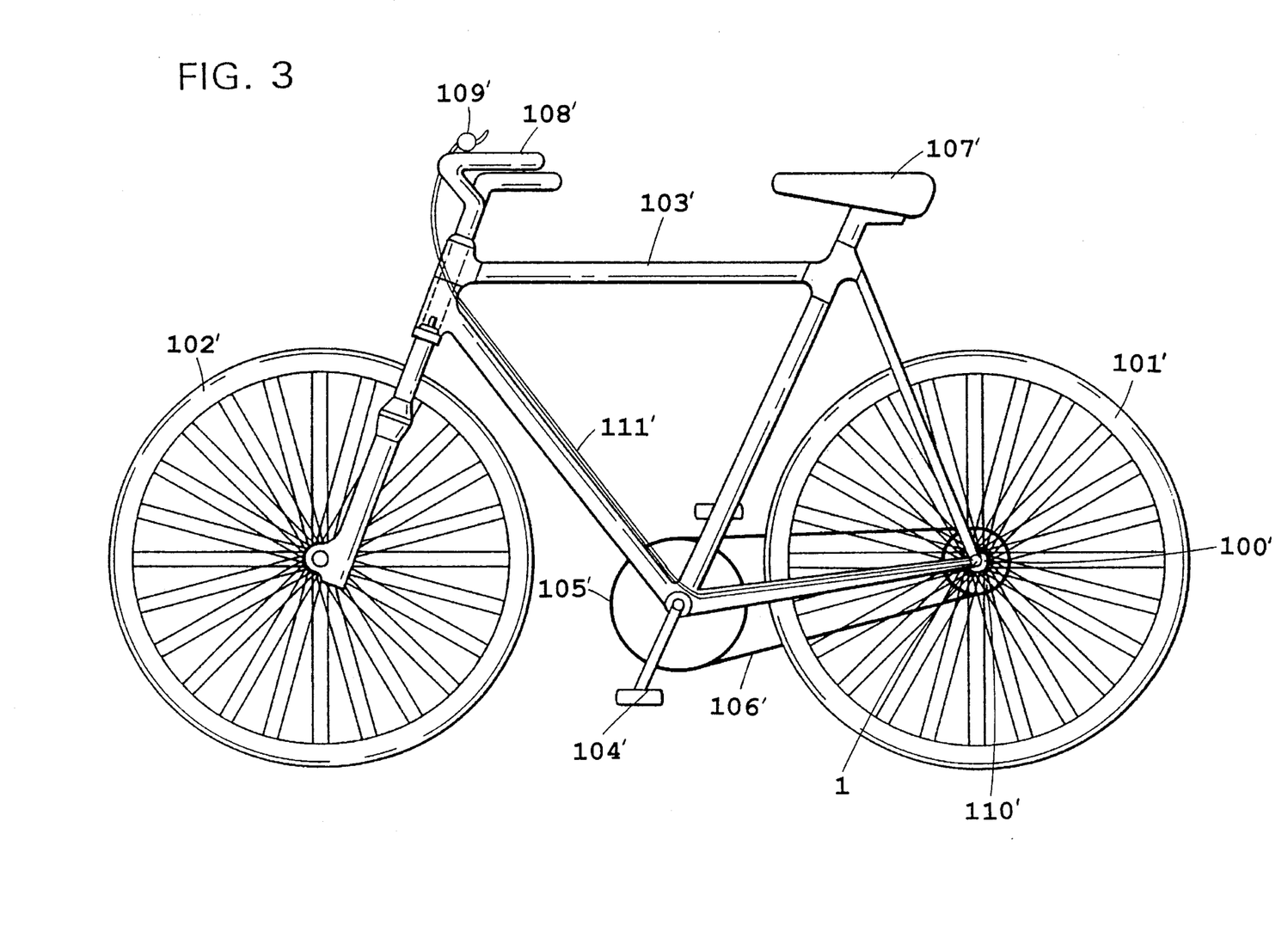
FIG. 3 shows a general depiction of a bicycle which could utilize a hub shift transmission as shown in FIGS. 1 and 2.

A bicycle having a multi-speed hub 100' on a rear wheel 101' thereof is generally depicted in FIG. 3. The hub 100' can have a hub axle 1, by means of which the hub 100' can be attached to a frame 103' of the bicycle. The frame 103' can also preferably support a front wheel 102'. A chain 106' and pedal system 104', 105' can preferably be provided to transmit a drive power to the hub 100' and the rear wheel 101'. The pedals 104' are preferably attached to a drive sprocket 105', the outside of which sprocket 105' preferably engages the chain 106'. The chain 106' is also preferably engaged about the hub 100' by means of an additional drive sprocket 110'. In addition to the above, a seat 107' can preferably be provided for the rider, while handlebars 108' can be provided for steering purposes. On the handlebars 108' there can also preferably be a gear shifting device 109' for shifting the gears of the multi-speed hub 100'. The shifting device 109' can preferably be operatively connected to the hub 100' by means of cables 111' that are fastened along the frame of the bicycle and preferably extend from the shifting device 109' to the hub 100'. Such cables 111' and shifting devices 109' are typically well known and are therefore not discussed in any further detail herein.

Figure 1:
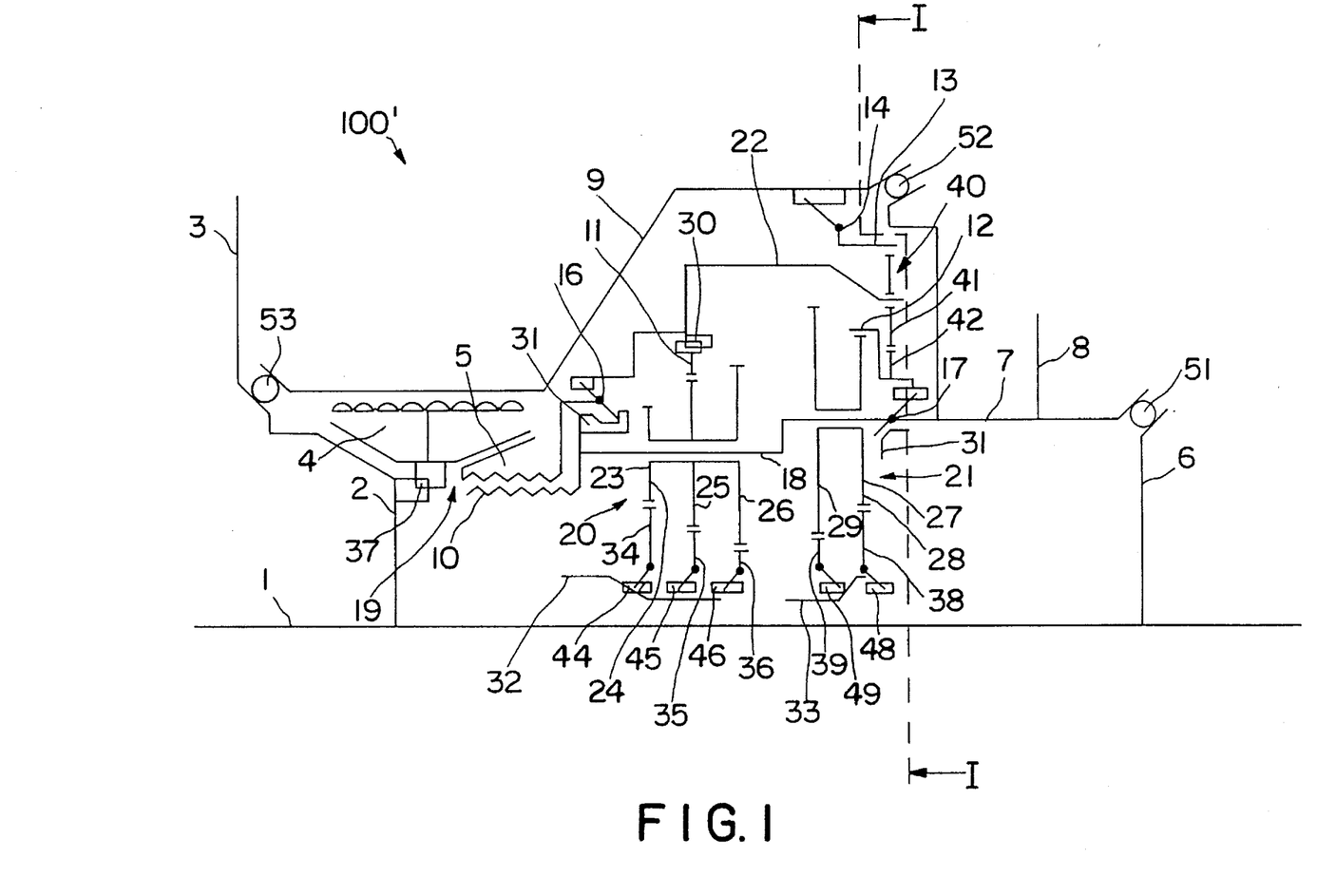
FIG. 1 is a schematic diagram a hub shift transmission with first, second and third planetary gear sets inside a hub sleeve.

As schematically illustrated in FIG. 1, within the hub 100', there can preferably be a hub shift transmission. As discussed above, the hub 100' and thus, the hub shift transmission can essentially be connected to the bicycle frame by means of hub axle 1. A lever cone 2 can preferably be fastened non-rotationally to the hub axle 1, and can preferably be fixed in the axial direction on the hub axle 1. A lever 3 of the lever cone 2 can be braced against the bicycle frame 103' (see FIG. 3) to further ensure a torsional strength of the hub 100'. Preferably rigidly connected to the side of the hub axle 1 opposite the lever cone 2 there can be a fixed cone 6, which by means of a first bearing 51 can provide the bearing base for a driver 7. On the driver 7, a driving pinion 8 can preferably be non-rotationally mounted. Such a driving pinion 8 can preferably comprise the sprocket 110' as discussed above with reference to FIG. 3.

On the largest diameter of this driver 7 there can preferably be a second bearing 52 to connect the driver 7 with a hub sleeve 9. In addition, the hub sleeve 9 can preferably be braced against the lever cone 2 by means of a third bearing 53. The driver 7 can preferably be non-rotationally connected to a first planetary carrier 1, on which a first multi-stage planet wheel 23 and a second multi-stage planet wheel 27 are preferably rotationally mounted. The first multi-stage planet wheel 23 essentially can belong to a first planetary gear set 20 with a first ring gear 11 and at least one sun wheel, wherein sun wheels 34, 35 and 36 are shown. The second multi-stage planet wheel 27 essentially can belong to a second planetary gear set 21 with a second ring gear 12 and at least one additional sun wheel, wherein sun wheels 38 and 39 are shown.

In the case of the embodiment shown in FIG. 1, the first multi-stage planetary gear set 20 can preferably be a three-stage gear set, and the first multi-stage planet wheel 23 can comprises the stages 24, 25 and 26 of increasing diameter. In the second multi-stage planetary gear set 21, the second multi-stage planet wheel 27 can analogously have at least two stages 28 and 29 of increasing diameter. The corresponding sun wheels 34, 35, 36, 38 and 39, located around the hub axle 1, can be connected to the hub axle 1 by means of free wheels 44, 45, 46, 48 and 49. These free wheels 44, 45, 46, 48 and 49 are preferably rotatable in only one direction of rotation, and can preferably have a blocking device for blocking rotation in the opposite direction. One type of freewheel mechanism which operates in such a manner is disclosed by the U.S. Pat. No. 5,273,500, which is hereby incorporated by reference. It should also be understood that other types of freewheel members, as are commonly known in the art, could also be used.

The free wheels 44, 45, 46, 48 and 49 can preferably be actuated along the hub axle 1 from outside the hub shift transmission by means of suitable control units 32 and 33. In general, such control units can be actuated by means of the shifting mechanism 109', as discussed earlier with reference to FIG. 3, and the cables 111', which cables can be connected in a known manner to the control units 32 and 33. By means of the shifting mechanism 109' (see FIG. 3) and the control units 32 and 33, various gear ratios can essentially be achieved inside the hub shift transmission by selectively actuating or positioning the free wheels 44, 45, 46, 48 and 49. In at least one embodiment of the present invention, such selection or actuation of the free wheels 44, 45 46, 48 and 49 can essentially comprise connecting the free wheels 44, 45 46, 48 and 49 to the hub axle 1 to be held by the hub axle 1 in a manner which is well known in the art to thereby engage a corresponding sun wheel 34, 35, 36, 38 and 39 with the hub axle 1.

Figure 2:
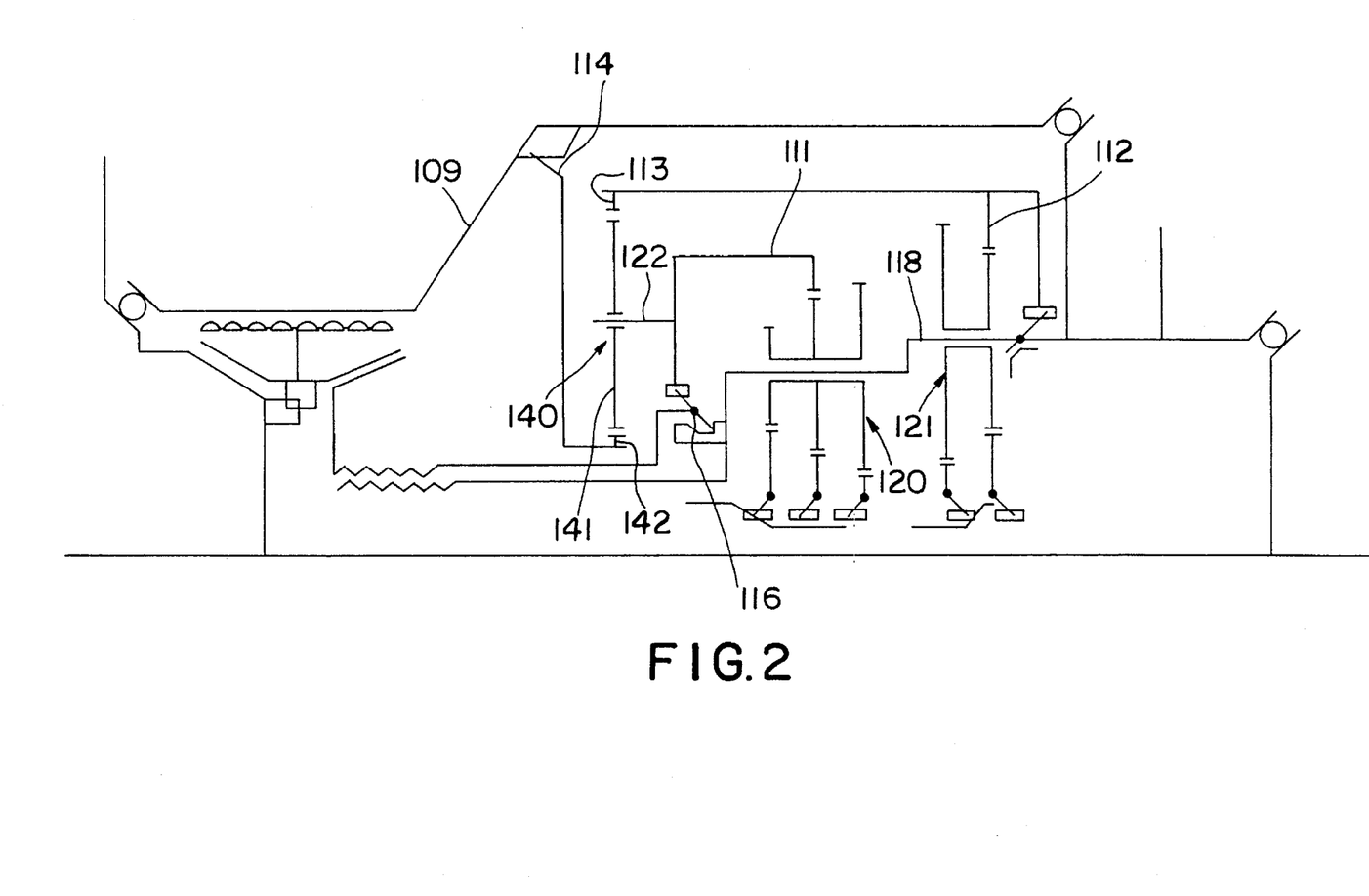
FIG. 2 shows a variant of the hub shift transmission as shown in FIG. 1 with a different arrangement of the third planetary gear set.

FIG. 2 illustrates a variant of the hub shift transmission shown in FIG. 1. In essence, for purposes of simplicity, FIG. 2 has labels only for parts and/or elements of this hub shift transmission which differ from those of the hub shift transmission shown in FIG. 1, but have a similarity in terms of function or appearance. These parts are identified with numbers which are greater by 100 than the numbers used in FIG. 1. The remaining unnumbered parts are essentially the same as the parts labelled in FIG. 1, and thus, any reference herebelow to unlabelled elements of FIG. 2 can essentially be referred to in FIG. 1.

In FIG. 2, the arrangement of the hub axle 1, the lever cone 2 with the lever 3, the fixed cone 6, the first multi-stage planetary gear set 23, the second multi-stage planetary gear set 27 and also the sun wheels 34, 35, 36, 38 and 39 with their free wheels 44, 45, 46, 48 and 49 on the hub axle 1, essentially corresponds to the arrangements described above with respect to FIG. 1. The driver 7 can likewise be braced against the fixed cone 6 by means of the first bearing 51 and against a modified hub sleeve 109 by means of the second bearing 52, which hub sleeve 109 can preferably roll along the lever cone 2 by means of the third bearing 53. The driver 7 can preferably be non-rotationally connected with a first planetary carrier 118, on which the first multi-stage planet wheel 23 and the second multi-stage planet wheel 27 can preferably be rotationally mounted. The first multi-stage planet wheel 23 essentially belongs to a first planetary gear set 120 with a first ring gear 111 and the sun wheels 34, 35 and 36. The second multi-stage planet wheel 27 essentially belongs to a second planetary gear set 121 with a second ring gear 112 and with sun wheels 30 and 39. In the case of the embodiment illustrated in FIG. 2, the first multi-stage planetary gear set 120 can also preferably be a three-stage gear set, and the first multi-stage planet wheel 23 can comprise the stages 24, 25 and 26. In the second planetary gear set 121, the second multi-stage planet wheel 27 can analogously have at least two stages 28 and 29.

Figure 2A:
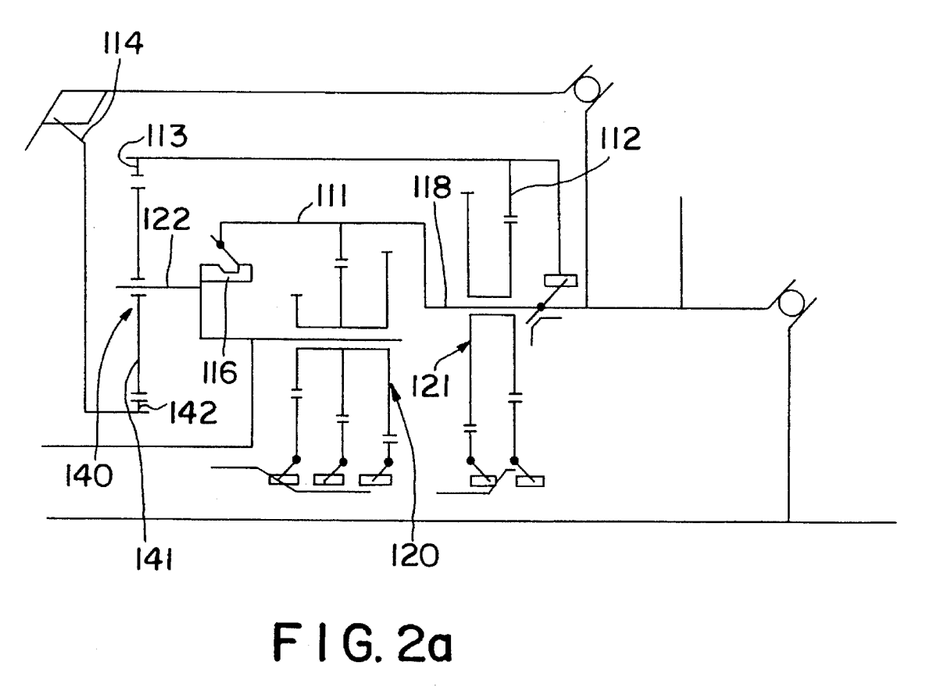
FIG. 2a shows another variant of the embodiment of FIG. 2.

Another possible variant which might be able to be provided in accordance with the present invention is depicted in FIG. 2a, wherein the drive 118 forms an integral part of the ring gear 111, and the planet carrier 122 acts as planet carrier for planetary gear 140 as well as planetary gear 120. Such an embodiment might be able to provide alternative gearing ratios as can be provided by the embodiment of FIG. 2.

As indicated in FIG. 1, the free wheels 44, 45 and 46 of the sun wheels 34, 35 and 36 are preferably oriented in the opposite direction of rotation from the free wheels 48 and 49 of the sun wheels 38 and 39, where the sun wheels 34, 35 and 36 can preferably freewheel backward on the hub axle 1, and the sun wheels 38 and 39 can preferably freewheel forward. Such an orientation is commonly known in the art and is further discussed in the above-reference U.S. Pat. No. 5,273,500.

Now, with reference to both FIGS. 1 and 2, one clutch device 16 and one clutch device 17, each acting in a single direction of rotation, can preferably be located on the planetary carriers 18, 118 on both sides of the planetary gear sets 20, 120 and 21, 121, when viewed axially. The clutch device 16 preferably drives in the driving direction of rotation, and the clutch device 17 preferably drives in the reverse direction of rotation. The driving side clutch device 17 preferably interacts with the second ring gear 12, 112 and the lever-cone-side clutch device 16 preferably interacts with one of the second planetary carriers 22, 122, whereby in the variant illustrated in FIG. 1, this clutch device 16 can preferably be non-rotationally connected to the second planetary carrier 22, via the ring gear 11 by means of a dog clutch 30. In the variant illustrated in FIG. 2, the first planetary carrier 118 essentially interacts directly with the first ring gear 111 via the clutch device 116, which ring gear 111 can again be connected to a second planetary carrier 122.

Figure 1A:
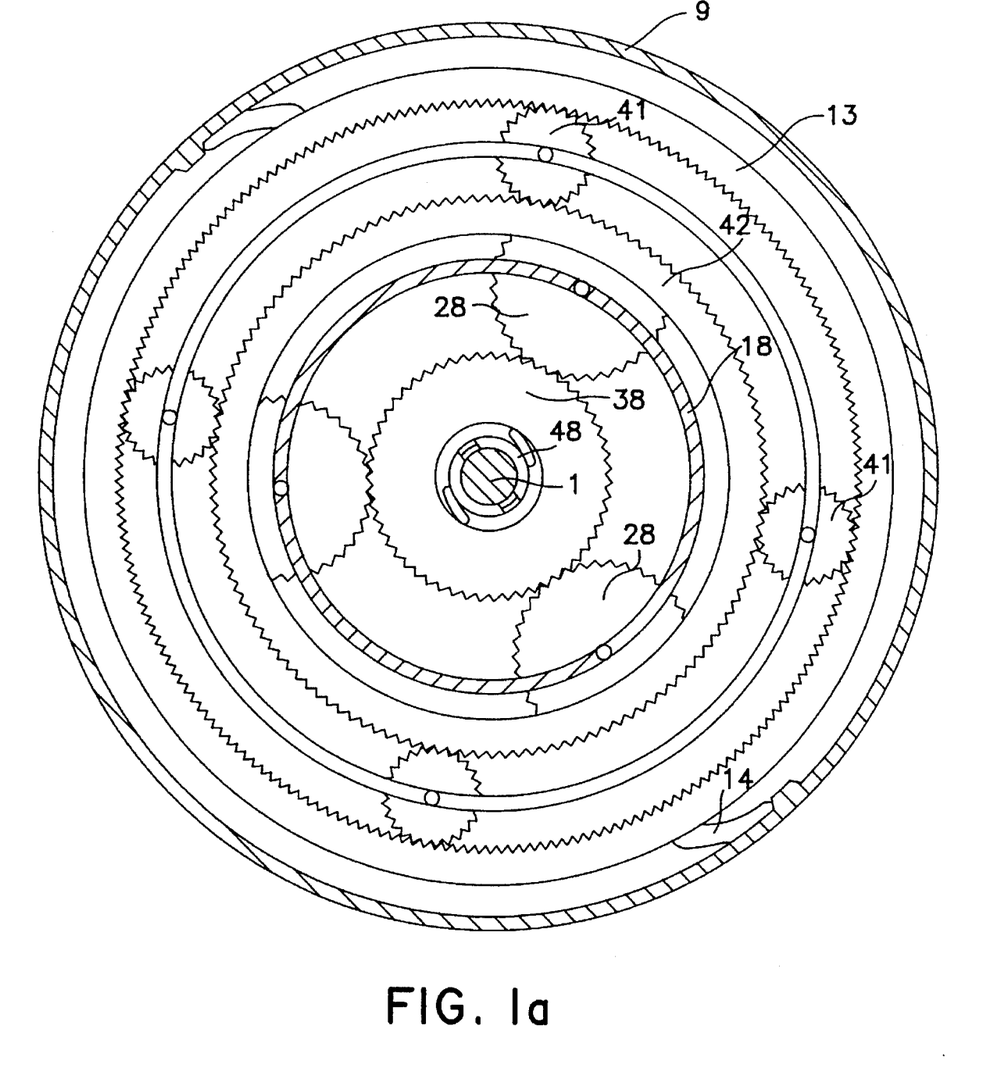
FIG. 1a shows a partial sectional view of the hub shift transmission taken along line I—I in FIG. 1.

With reference to FIGS. 1 and 2, the second planetary carrier 22, 122 can essentially be an integral component of a differential planetary gear set 40, 140, which is depicted in greater detail in FIG. 1a. This differential planetary gearset 40, 140 can preferably have at least a one-stage differential planet wheel 41, 141, a differential ring gear 13, 113 and a differential sun wheel 42, 142. As shown in FIG. 1, the differential ring gear 13 can preferably interact with the hub sleeve 9 via a clutch device 14, which clutch device 14 preferably engages in the driving direction of rotation and can preferably freewheel in the reverse direction of rotation. In the variant illustrated in FIG. 2, the differential sun wheel 142 is preferably mechanically connected to the hub sleeve 109 by means of a clutch device 114, which clutch device 114 can preferably be engaged in the driving direction of rotation and can preferably freewheel in the reverse direction.

The first planetary carrier 18, 118, in at least one embodiment of the present invention, can preferably have a threaded portion 10 on its lever-cone-side end, onto which threaded portion 10 a brake cone 5 can be screwed. The threaded portion 10 can essentially be realized as a right-handed thread with a steep thread pitch so that the brake cone 5, the rotation of which can be restricted by a friction not indicated here, moves to the driving side to the block position when the first planetary carrier 18 rotates in the driving direction of rotation, and, when the first planetary carrier 18 rotates in the reverse direction, moves in the direction of the lever cone 2 toward a brake system 19. This brake system 19 preferably includes a brake shell 4 which can be made up of a number of parts, and which can be moved outward against the hub sleeve 9 for the generation of frictional forces when one of the bevels of the brake cone 5 slips under the brake shell 4. This brake shell 4 can preferably be braced against the lever cone 2 and can transmit its rotational forces to the lever cone by means of an interlocking member, or dog clutch 37. The rotational forces are preferably supported against the frame 103' (FIG. 3) of the bicycle by means of the arm 3, thereby essentially prohibiting rotation of the brake cone 5 during a braking action, or, in other words, during a frictional engagement of the brake cone 5 with the hub shell 9.

The clutch device 16, 116 connected to the first planetary carrier 18, 118 can preferably be actuated by means of a lifting apparatus 31, whereby this actuation functions automatically when moving backwards, or in other words, during a back pedalling, or braking action. If none of the sun wheels 34, 35 and 36 are located on the hub axle 1, the clutch device 16, 116 can preferably generate an additional direct speed, as can preferably the clutch device 17 on the second planetary gear set 21.

The cyclist can preferably use the liftable free wheels 44, 45, 46, 48 and 49, as well as the liftable clutch device 17, to manually select the individual speeds from the outside. Consider the first planetary gear set 20, 120, the function of which is essentially to drive a first ring gear 11, 111. The free wheels 44, 45 and 46 can preferably be sequentially lifted by means of the first control unit 32. In at least one embodiment of the invention, the control unit could possibly be a simple sleeve disposed about the axle 1, which sleeve could preferably slide between the free wheels 44, 45, 46 and the axle 1 to thereby block engagement with the axle 1.

For example, if the free wheels 44 and 45 are blocked, or lifted, the first planetary gear set 20, 120 can interact with the first ring gear 11, 111 via the free wheel 46 via the sun wheel 36 via the third stage 26 of the first multi-stage planet wheel 23 via the second stage 25. If the first control unit 32 is retracted, the free wheel 45 can preferably engage and support the sun wheel 35 against the hub axle 1. By means of the different speeds of the sun wheels 35 and 36, the speed of the engaged sunwheel 35 overtakes the freewheel 46, and the flow of force is via the free wheel 45, the sun wheel 35, the second stage 25 of the first multi-stage planet wheel 20 to the first ring gear 11, 111. Finally, if the first control unit 32 is further retracted so that the free wheel 44 is able to rest against the hub sleeve axle 1, the two free wheels 45 and 46 are outrun and the sun wheel 45 rests against the hub axle 1.

However, if the free wheels 44, 45 and 46 are lifted out (i.e., if the control unit 32 was possibly returned to the right), the clutch device 16, 116 can preferably be active in the drive direction with respect to the first ring gear 11, 111, thereby providing a direct connection between the first planetary carrier 18, 118 and the ring gear 11, 111. In essence, the clutch device 16, 116 would always be engaged in the drive direction, but when there is a connection between at least one of the freewheels and the hub axle 1, the clutch device 16, 116 would be outrun. This clutch device 16, 116 could preferably be in the form of a spring biased pawl clutch in at least one embodiment of the present invention, whereby the pawls can be biased outwardly to engage the inside of the ring gear 11, but when being outrun, the pawls can be depressed inwardly. Such clutch devices are essentially well known and will therefore not be discussed in any further detail herein.

As should essentially be clear from the configurations described above, there can thus preferably be four possible speeds with a three stage planetary gear 23. (For planetary gears having an alternative number of stages, the number of gears would essentially equal the number of stages plus one.) With the depicted embodiment of three stages, first, all three free wheels 44, 45 and 46 can be lifted out, thereby producing a direct drive by means of the clutch device 16, 116. Then the two free wheels 44 and 45 can be lifted out producing drive via the first stage 26. Then only the free wheel 44 can be lifted out producing drive via the second stage 25, and finally, when the control is removed and the free wheel 44 is able to rest against the hub axle 1, the drive would be provided by means of the third stage 24, during which configuration, the free wheels 45 and 46, as well as the clutch device 16 would be outrun.

The second planetary gear set 21 preferably includes two free wheels 48 and 49 and a clutch device 17. Instead of actuating both free wheels 48 and 49 by means of the second control unit 33, which could easily be done, the free wheel 49 and the clutch device 17 of the variants shown in FIGS. 1 and 2 can be actuated automatically, and the free wheel 48 can preferably be made to operate automatically. In a manner similar to that described above for the first planetary gearset 20, 120, the second planetary gearset 21, 121 can preferably produce three speeds (one more than the number of gear stages of the planet wheel 27). This second planetary gearset 21, 121, can preferably be provided to drive a second ring gear 12, 112 which can be rigidly connected to a differential sun wheel 42.

With this second planetary gearset 21, 121, a direct speed can preferably be achieved by lifting the lifting device 31 at the clutch device 17, thereby engaging the clutch device 17 to provide a direct connection between the first planetary carrier 18, 118 and the second ring gear 12, 112. In this case, the engaged free wheels 48 and 49 would be outrun. The next fastest speed is produced by lifting the clutch device 17 to disengage the clutch device 17, and lifting the free wheel 49, whereby the free wheel 48 can then drive. The fastest translation ratio can preferably be achieved by lifting the lifting device of the free wheel 49, thereby engaging the free wheel 49 so that the free wheel 49 can also be driven, as a result of which the free wheel 48 would be outrun. The clutch device 17 must remain raised, or disengaged.

As mentioned above, the free wheels 44, 45 and 46, as well as the clutch devices 14, 114 and 16, 116 preferably block forward relative to the driver 7, while the free wheels 48 and 49, as well as the clutch device 17 preferably block backward.

To achieve the 4 times 3 speeds, i.e., a total of 12 speeds, with the depicted embodiments of FIGS. 1 and 2, the power flow from the two planetary gear sets 20, 120 and 21, 121 essentially must be consolidated. This can preferably be done by providing a differential planetary gear set 40, 140 at the hub sleeve 9, 109.

As shown in FIG. 1, the first ring gear 11 preferably acts on the second planetary carrier 22 as the first gear output from the first planetary gear set 20, whereby the clutch device 16 must essentially also be considered part of this gear output. The second ring gear 12, on which the clutch device 17 acts analogous to the first gear output, can essentially be considered to be the second gear output. As described above, the second ring gear 12 can be rigidly connected to the differential sun wheel 42. Thus, the two gear outputs from the first and second planetary gear sets 20 and 21 can be unified in the differential planet gear set 40 and coupled, via the differential planet wheel 41, with the differential ring gear 13 via a clutch device 14 of the hub sleeve 9, which assembly blocks in the driving direction of rotation.

In the second variant of the hub shift transmission shown in FIG. 2, the first ring gear 111 preferably acts on the second planetary carrier 122 as the first gear output from the first planetary gear set 120, whereby the clutch device 16, the driving portion of which is rigidly connected to the first planetary carrier 118, must likewise be considered part of this gear output, since it acts on the second planetary carrier 122. The second ring gear 112, on which the clutch device 17 acts analogous to the first gear output, can be considered the second gear output. However, in this embodiment, the second ring gear 112 preferably interacts with the differential ring gear 113, while the first ring gear 111 interacts with the second planetary carrier 122, by means of which the two gear outputs in the differential planetary gear set 140 are united via the differential planet wheel 141 and the power flow is transferred to the differential sun wheel 142. The output power then flows from the sunwheel 142, which is coupled with the hub sleeve 109 via the clutch device 114 which clocks in the driving direction of rotation.

Because of the multiplicity of the speeds, the following shift chart has been prepared to describe the function and shifting capabilities of the current hub shift transmission. This chart is essentially valid for both variants of the hub shift transmission, shown in FIGS. 1 and 2, in accordance with the present invention. In the chart, (A) indicates an external control action on the hub shift transmission, i.e., the respective free wheel or clutch device is lifted, or inactive. The resulting sequence is described with (s) and (u), where (s) means that the clutch device or the free wheel blocks, or drives, and (u) means that the clutch device or the free wheel is outrun. The capital letters indicate the cause and the small letters the effect.

| | | SHIFTING CHART | | | | | |
| --- | --- | --- | --- | --- | --- | --- | --- |
| | | First planetary gear set 20, 120 | | | | Second planetary gear set 21, 121 | |
| Speed | Clutch 16 | Free-wheel 44 | Free-wheel 45 | Free-wheel 46 | Clutch 17 | Free-wheel 49 | Free-wheel 48 |
| 1 | s | A | A | A | A | s | u |
| 2 | s | A | A | A | A | A | s |
| 3 | s | A | A | A | s | u | u |
| 4 | u | s | u | u | A | s | u |
| 5 | u | s | u | u | A | A | s |
| 6 | u | s | u | u | s | u | u |
| 7 | u | A | s | u | A | s | u |
| 8 | u | A | s | u | A | A | s |
| 9 | u | A | s | u | s | u | u |
| 10 | u | A | A | s | A | s | u |
| 11 | u | A | A | s | A | A | s |

-continued

SHIFTING CHART

| Speed | Clutch 16 | First planetary gear set 20, 120 | | | Clutch 17 | Second planetary gear set 21, 121 | |
|---|---|---|---|---|---|---|---|
| | | Free-wheel 44 | Free-wheel 45 | Free-wheel 46 | | Free-wheel 49 | Free-wheel 48 |
| 12 | u | A | A | s | s | u | u |

For the depicted embodiments, the first speed can preferably be achieved by lifting the free wheels 44, 45 and 46, as well as the clutch device 17, as a result of which the first planetary carrier 1, 118 is connected directly to the first ring gear 11, 111 via the clutch device 16, by-passing the first planetary gear set 20, 120, while the free wheel 49 blocks and the sun wheel 39 for the second planetary gear set 21, 121 activates. The free wheel 48 preferably runs forward faster under no load, that is, the free wheel 40 is outrun. The second planetary carrier 22, via the direct engagement between the driver 7, carrier 18, ring gear 11, and carrier 22, can thus preferably run at the driving speed as shown in FIG. 1, while the differential sun wheel 42 turns with the highest step-up ratio. Inside the differential planetary gear set 40, this results in a relatively slower speed of the differential ring gear 13, by means of which the hub sleeve 9, driven via the clutch device 14, turns at its slowest speed, by means of which a hill-climbing speed with the greatest multiplication can be achieved. That is, the hub sleeve 9 would essentially turn only a portion of a revolution for each revolution of the driver 7. In one possible embodiment, the hub sleeve 9 could possibly turn a half revolution for each revolution of the driver 7. In further embodiments, depending on the sizes of the gears, other turning ratios would be possible, and it would be well within the skill of the artisan to provide desired turning ratios.

The second speed shifts the power transfer from free wheel 49 to the automatic free wheel 48 by lifting the free wheel 49. The multiplication in the second planetary gear set 21 becomes less, and the second ring gear 12 and the differential sun wheel 42 run slower, as a result of which the differential ring gear 13 and thus the hub sleeve 9 run correspondingly faster for a constant speed of the second planetary gear set 21. That is, the hub sleeve 9 would essentially turn a greater portion of a revolution for each revolution of the driver 7. In one possible embodiment, the hub sleeve 9 could possibly turn three-quarters of a revolution for each revolution of the driver 7.

The third speed can be achieved by lifting the lifting device at the clutch device 17 thereby engaging the clutch 17, as a result of which the second ring gear 12 is directly driven at a speed which is slower than the two speeds described above, or the direct speed of the driver 7 because of the direct connection. Since the clutch device 16 also blocks, bringing the second planetary carrier 22 to the driving speed, the differential sun wheel 42 and the differential ring gear 13 would both turn at the driving speed. The differential planet wheels 41 thus would essentially not rotate relative to the differential sun wheel 42 and the differential ring gear 13. The hub sleeve 9 can thus be carried along at the driving speed, which corresponds to a direct drive, or one revolution of the hub sleeve 9 for each revolution of the driver 7.

The fourth speed of the system can be achieved, in the second planetary gearset, from the third speed simply by lifting, or disengaging the clutch 17, or, from the second speed, by lifting the lifting device of the shiftable free wheel 49 to engage the free wheel 49. In addition, in the first planetary gearset 20, the lifting device of the free wheel 44 of the first planet wheel 23 can also be lifted, thus, engaging the free wheel 44, causing this free wheel 44 to block and forcing the free wheels 45 and 46 to be overrun, whether the free wheels 45 and 46 have been lifted or not. So that the second planetary gear set 21 may also be used for translation, the clutch device 17 is lifted. To generate the speed of the hub sleeve 9, the differential sun wheel 42 again rotates with maximum multiplication and the second planetary carrier 18 turns at the slowest speed of the first planetary gear set 20, but still faster than in direct gear, or faster than bypass of the first planetary gearset 20, when the clutch device 16 blocks, or drives.

With the above description of the first four speeds, it is believed that the principle of speed generation has been described with sufficient clarity with regards to the remaining speeds. However, a further mention will be made herebelow with regard to the twelfth speed, which is reached when, to achieve the greatest overdrive multiplication, the differential sun wheel 42 turns as slowly as possible and the second planetary carrier 18 turns as fast as possible. The slowest speed for the differential sun wheel 42 can essentially be achieved by lifting the lifting device for the clutch device 17 to engage the clutch device 17, as a result of which the differential sun wheel 42 turns at the driving speed of the driver 7. The maximum speed of the second planetary carrier 18 through the first planetary gear set 20 can be achieved by means of the lifting of the lifting device of the free wheel 46 thereby engaging the freewheel 46. The free wheels 44 and 45 essentially must be lifted for the blocking of the free wheel 46. The clutch device 16 is thereby overrun. The differential ring gear 13 and thus the hub sleeve 9 reach their maximum multiplication ratio with respect to the first planetary carrier 18 with its driver 7 turning at the driving speed. Thus, a single revolution of the driver 7 can possibly produce multiple revolutions of the hub sleeve 9.

Everything said about the hub shift transmission shown in FIG. 1 with respect to the shifting sequence according to the shift chart can essentially apply to the generation of speeds for the hub shift transmission illustrated in FIG. 2. However, the effect on the hub sleeve 109 via the clutch device 114 differs by a greater or lesser degree depending on the configuration, whereby the spread and the gear intervals can be different. The difference can essentially be due to the fact that while the second planetary carrier 122 is still driven by the first planet gear set 120, the output of the second planetary gearset 121 is to the ring gear 113 and not sun wheel 142, while the output to the clutch device 114 and the hub sleeve 109 is via the differential sun wheel 142 and not the ring gear 113. If the rider shifts into a hill-climbing gear, the second planetary carrier 122 must turn as slowly as possible and the differential ring gear 113 must turn as fast as possible. As revealed by comparing this to the hill gear of the variant shown in FIG. 1, the fast speed comes from the second planetary gear set 121 and the slow speed comes from the first planetary gear set 120. The differential sun wheel 142 turns slowly and imparts this speed to the hub sleeve 109. The individual speeds can essentially be produced analogously and with no changes from the shifting chart which applies to the variant shown in FIG. 1, as described above.

The brake 4, 5 can preferably be activated by pedalling backwards and thus reversing the drive pinion 8 on the driver 7 of the first planetary carrier 18, 118 and finally the threaded portion 10, which is preferably non-rotationally connected to the first planetary carrier 18, 118. The brake cone 5, the rotation of which is limited by a function unit not shown here, preferably turns in the direction of the brake shell 4 and forces the shell 4 outward against the hub sleeve 9, 109, by means of which braking is initiated. The braking torque can essentially be transferred via the dog clutch 37 to the bicycle frame via the lever cone 2 and the arm 3. The clutch device 16 can preferably be equipped with lifting device 31 which can interrupt the power flow in the driving direction of rotation when the brake cone moves axially to ensure that there is a sufficient idle angle of rotation in the driving direction, so that the brake can preferably be released. Alternatively, if it is desired that a brake not be provided within the hub, one could eliminate the braking components from the hub, and, as is well within the skill of the artisan, provide brake pads or a disc brake etc. for the wheel, externally of the hub.

Figure 4:
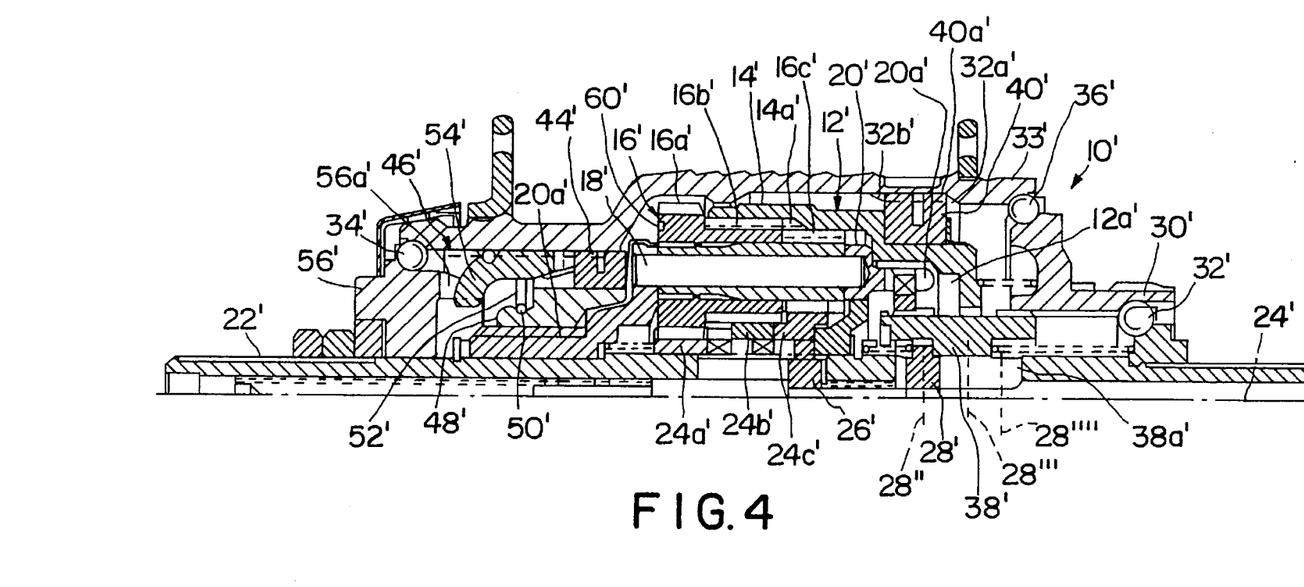
FIGS. 4, 4a and 4b show a longitudinal sectional view through another embodiment of a bicycle hub depicting in more detail the components of a hub.

FIG. 4 depicts an alternative embodiment of a bicycle hub and components thereof which could possibly be interchangeable with similar components as discussed above. FIG. 4 shows a cross-sectional view along the longitudinal axis of the hub and thereby essentially provides an actual depiction of components of a hub, as compared to the schematic illustrations of FIGS. 1 and 2.

The multi-speed bicycle wheel hub 10' illustrated in a simplified longitudinal section in FIG. 4 has, as its "core", a sun and planet gear mechanism 12', which makes the required gear ratios available by upshifting (to higher speeds) and downshifting (to lower speeds).

The sun and planet gear mechanism 12' preferably has a ring gear 14'. The inside circumference gearing 14a' of the ring gear 14' is preferably continuously engaged with planet wheels 16', of which there are at least two in each planetary transmission, for a balance of forces and for self-centering. In the normal case, there preferably are three planet wheels 16'. The planet wheels 16' can preferably be mounted by means of bearing bolts 18' on a common planet wheel carrier 20' so that they can rotate. The cage-like planet wheel carrier 20' is preferably mounted by means of a bearing segment 20a' so that it can rotate on a stationary hub axle 22'. The longitudinal axis of the hub axle 22' can preferably define an axis of rotation 24' of the bicycle wheel hub 10', around which the moving parts of the bicycle wheel hub 10' can rotate.

The planet wheels 16' are preferably designed in three stages with a large planet wheel stage 16a' having the maximum number of teeth, an intermediate planet wheel stage 16b' having an intermediate number of teeth, and a small planet wheel stage 16c' having the lowest number of teeth. The intermediate planet wheel stage 16b' is preferably continuously engaged with the ring gear 14'. All of the stages of the planet wheel, i.e. 16a', 16b', and 16c' are preferably continuously engaged with corresponding sun wheels 24a', and 24b' and 24c'.

By means of a pawl 26', which pawl 26' can be moved parallel to the axis of rotation 24', one of the sun wheels 24a', 24b', 24c' can be selected and fixed in a non-rotating manner on the hub axle 22'. The pawl 26' is preferably connected (in a manner not shown) to a manual shifting mechanism 109' (see FIG. 3) on the bicycle handlebars 108'. A second pawl 28', which is also connected to the manual shifting mechanism 109', is preferably used to switch among three different force paths from a driver 30', supporting a sprocket wheel (not shown in FIG. 4), to a hub sleeve 33', to which are attached the bicycle spokes for the bicycle rim. The driver 30' is preferably mounted by means of a ball bearing 32' on the hub axle 22'. The hub sleeve 33' is preferably mounted on one end by means of a ball bearing 34' on the hub axle 22', and on the other end by means of a ball bearing 36' preferably on the driver 30'.

In the left end position of second pawl 28', designated 28" in FIG. 4, the force path can preferably run from the driver 30' by means of a clutch ring 38' with clutch gearing 38a', to a corresponding clutch gearing 20a' of the planet wheel carrier 20'. The planet wheel carrier 20' can, in turn, drive, by means of the planet wheels 16', the ring gear 12', and namely with a translation ratio which is preferably determined by the currently fixed sun wheel 24a' to 24c'. A freewheel clutch in the form of a locking pawl 40' essentially makes certain that the hub sleeve 33' moves along with the ring gear 12'. The high gear with the highest transmission ratio (in this embodiment, 7th gear) is preferably selected by fixing the largest sun wheel 24c'. The 6th and 5th gears are preferably selected by fixing the sun wheel 24b' or the sun wheel 24a', respectively.

By shifting the pawl 28' into an intermediate position designated 28''', the clutch ring 38' will essentially be moved to the right as shown in FIG. 4, whereby the clutch gearing 38a' is preferably disengaged from the clutch gearing 20a' of the planet wheel carrier 20', but is preferably still engaged with a corresponding clutch gearing 12a' of the ring gear 12'. The result is the direct 4th gear, in which the force flows via the clutch ring 38' to the ring gear 12', and via the pawl coupling 40' preferably to the hub sleeve 33'.

As a result of further shifting of the pawl 28' into the right limit position designated 28"" in FIG. 4, the ring gear 12' with the clutch ring 38' is pushed to the right. Consequently, the pawl coupling is deactivated, since the pawls 40a' are pivoted radially inward as a result of a deflector surface 32a' on the inside circumference of the hub sleeve 33', and are thus disengaged from the radially inwardly projecting clutch projections 32b' of the hub sleeve 33'.

The force now flows from the driver 30' via the clutch ring 38' to the ring gear 12', and from the latter via the planet wheels 16' rolling on one of the sun wheels 24a' to 24c' to the planet wheel carrier 20'. Its rotation is transmitted by an additional pawl coupling 44' to the hub sleeve 33'. This panel coupling 44' is also overtaken in 7th, 6th and 5th gears by the more rapidly rotating hub sleeve 33'.

The rider can downshift (when travelling uphill), and, in particular, can downshift the least amount by activating the sun wheel 24a'. Preferably, this minimal shifting would correspond to 3rd gear. The rider can downshift an intermediate amount by activating the sun wheel 24b', and by the maximum amount when the sun wheel 24c' is activated. Preferably, the intermediate shifting would correspond to 2nd gear, and the maximal shifting would correspond to 1st gear.

In all the gears, a braking device 46' makes possible an immediate deceleration of the hub sleeve 33' when the rider backpedals. For this purpose, a brake activation piece 48' is preferably mounted by means of a coarse screw thread 50' on the segment 20a' of the planet wheel carrier 20'. When the rider backpedals, a stationary pre-stressed spring 52' engaged with the brake part 48' can essentially guarantee that the brake part 58' is temporarily not co-rotating, and thus moves to the left in FIG. 4 toward brake jaws 54', on account of the coarse screw thread. Corresponding angled surfaces on the brake activation part 48' and the brake jaws 54' are pressed radially outward to make braking contact against the inside circumference surface of the hub sleeve 33'. Holding lugs 56a' on a hub flange 56' attached in a non-rotating manner to the hub axle 22' prevent co-rotation of the brake jaws 54'.

In a known manner, a series of prestress springs (not shown) preferably guarantee the return of the corresponding parts to their initial position.

On the multi-speed bicycle wheel hub 10' as a mass-produced product, the economical manufacture of all the parts and their reliable operation are both important. With regard to the planet wheels 16', it is of particular importance that the rolling gearings of the planet wheel stages 16a', 16b' and 16c' have a precisely specified gear rim orientation relative to one another so that, while retaining a uniform initial orientation, all three planet wheels 16' of the planetary transmission 12' can be assembled preferably without forcing any of the teeth.

Figure 4A:
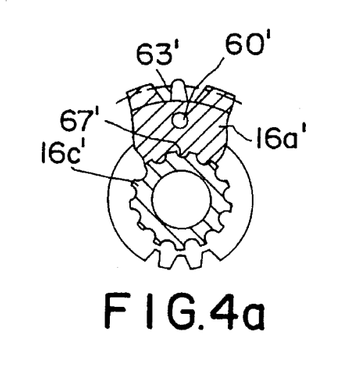
Figure 4B:
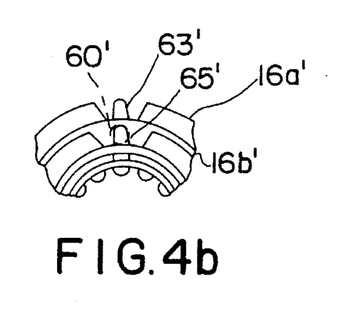

The initial orientation of a planet wheel 16' can be marked by a recess 60' on the left end surface of the planet wheel 16' in FIGS. 4, 4a and 4b. As shown in FIG. 4b, the angular orientation of the gear rim of the planet wheel stages 16a', 16b' and 16c' can be defined, for example, so that in the angular position corresponding to the marking recess 60', the corresponding tooth 63' of the gear rim of the planet wheel stage 16a' lies precisely in the same angular position as the corresponding tooth 65' of the planet wheel stage 16b'. On the other hand, as shown in FIG. 4a, a tooth space 67' of the gear rim of the planet wheel stage 16c' lies precisely in the above-mentioned angular position, defined by the marking recess 60'.

This specified orientation of the gear rims of the planet wheel stages 16a, 16b and 16c relative to one another can thus be reliably maintained even if a two-piece design of the planet wheel 16' is used instead of a single molded piece.

One feature of the invention resides broadly in the multi-speed drive hub for bicycles, comprising: a hub axle 1 which can be non-rotationally attached to a bicycle frame; a fixed cone 6 which is located non-rotationally on the hub axle 1; a lever cone 2 which is located on the hub axle 1, and which is non-rotationally connected to the bicycle frame by means of a lever 3; a driver 7 rotationally mounted on the hub axle 1 with a drive pinion 8; a hub sleeve 9 which is concentric to the hub axle 1 and mounted on the driver 7 and on the lever cone 2, and enclosing a hub shift transmission; a brake device 19 comprising a brake shell 4 and a brake cone 5; a hub shift transmission; consisting of a first planetary gear set 20 with at least one stage and a second planetary gear set 21 with at least one stage, as parts of this hub shift transmission, comprising: a first planetary carrier 18 mounted rotationally on the hub axle 1; a first multi-stage planet wheel 23 mounted rotationally on the first planetary carrier 18; a second multi-stage planet wheel 27 mounted rotationally on the first planetary carrier 18; a sun wheel 34, 35, 36 corresponding to each of the individual stages 24, 25, 26 of the first multi-stage planet wheel 23, and engaged with these stages, which is rotationally mounted on the hub axle 1, and can be optionally non-rotationally connected to the hub axle 1 in any respective axial connection position by means of a freewheel 44, 45, 46; a sun wheel 38, 39 corresponding to each of the individual stages 28, 29 of the second multi-speed planet wheel 27 and engaged with this stage, and which is rotationally mounted on the hub axle 1 and can be optionally rotationally connected to the hub axle 1 in any axial connection position; a first ring gear 11 rotationally mounted inside the hub sleeve 9 concentrically around the hub sleeve 1, and which is engaged, for example, with the stage 25 of the first multi-stage planet wheel 23; a second ring gear 12 rotationally mounted inside the hub sleeve 9 concentrically around the hub axle 1, and which is engaged, for example, with the stage 28 of the planet wheel 24; characterized by the fact that a differential planetary gear set 40 with at least one stage is located in the hub shift transmission inside the hub sleeve 9, and the second planetary carrier 22 of which interacts with the first ring gear 11, the differential ring gear 13 of which interacts with the hub sleeve 9, and the differential sun wheel of which interacts with the second ring gear 12.

Another feature of the invention resides broadly in the drive hub characterized by the fact that the differential ring gear 13 is actively connected to the hub sleeve 9 by means of a clutch device 14 which acts in one direction of rotation.

Yet another feature of the invention resides broadly in the drive hub characterized by the fact that the second ring gear 12 forms a modular unit with the differential sun wheel 42 of the differential planetary gear set 40.

Still another feature of the invention resides broadly in the drive hub characterized by the fact that the second planetary carrier 22 is connected, e.g. by means of a dog clutch 30, to the second ring gear 11.

A further feature of the invention resides broadly in the drive hub characterized by the fact that the second planetary carrier 22 is actively connected to the first planetary carrier 18 by means of a clutch device 16 which acts in one direction of rotation.

Another feature of the invention resides broadly in the drive hub characterized by the fact that the clutch device 16 can be actuated in reverse, when the brake is in operation.

Yet another feature of the invention resides broadly in the drive hub characterized by the fact that the first planetary carrier 18 and the driver 7 are non-rotationally connected to one another.

Still another feature of the invention resides broadly in the drive hub characterized by the fact that the second ring gear 12 is connected to the first planetary carrier 19 by means of a clutch device 17 which acts in one direction of rotation.

A further feature of the invention resides broadly in the drive hub characterized by the fact that the clutch device 17 can be actuated.

Another feature of the invention resides broadly in the multispeed drive hub for bicycles, comprising: a hub axle 1 which can be non-rotationally attached to a bicycle frame; a fixed cone 6 which is located non-rotationally on the hub axle 1; a lever cone 2 which is located on the hub axle 1, and which is non-rotationally connected to the bicycle frame by means of a lever 3; a drive 7 rotationally mounted on the hub axle 1 with a drive pinion 8; a hub sleeve 109 which is concentric to the hub axle 1 and mounted on the driver 7 and on the lever cone 2, and enclosing a hub shift transmission; a brake device 19 comprising a brake shell 4 and a brake cone 5; a hub shift transmission, consisting of a first planetary gear set 120 with at least one stage and a second planetary gear set 121 with at least one stage, as parts of this hub shift transmission, comprising: a first planetary carrier 118 mounted rotationally on the hub axle 1; a first multi-stage planet wheel 23 mounted rotationally on the first planetary carrier 118; a second multi-stage planet wheel 27 mounted rotationally on the first planetary carrier 118; a sun wheel 34, 35, 36 corresponding to each of the individual stages 24, 25, 26 of the first multi-stage planet wheel 23, and engaged with these stages, which is rotationally mounted on the hub axle 1, and can be optionally non-rotationally connected to the hub axle 1 in any respective axial connection position by means of a freewheel 44, 45, 46; a sun wheel 38, 39 corresponding to each of the individual stages 28, 29 of the second multi-speed planet wheel 27 and engaged with this stage, and which is rotationally mounted on the hub axle 1 and can be optionally rotationally connected to the hub axle 1 in any axial connection position; a first ring gear 111 rotationally mounted inside the hub sleeve 109 concentrically around the hub sleeve 1, and which is engaged, for example, with the stage 25 of the first multi-stage planet wheel 23; a second ring gear 112 rotationally mounted inside the hub sleeve 109 concentrically around the hub axle 1, and which is engaged, for example, with the stage 28 of the planet wheel 24; characterized by the fact that a differential planetary gear set 140 with at least one stage is located in the hub shift transmission inside the hub sleeve 109, and the second planetary carrier 122 of which interacts with the first ring gear 111, and the differential sun wheel 142 of which interacts with the hub sleeve 109, and the differential ring gear 113 of which interacts with the second ring gear 112.

Yet another feature of the invention resides broadly in the drive hub characterized by the fact that the differential sun wheel 142 is connected to the hub sleeve 109 by means of a clutch device 114 which acts in one direction of rotation.

Still another feature of the invention resides broadly in the drive hub characterized by the fact that the first ring gear 111 forms a modular unit with the second planetary carrier 122 of the differential planet wheel set 140.

A further feature of the invention resides broadly in the drive hub characterized by the fact that the second planetary carrier 122 is actively connected to the first planetary carrier 118 by means of a clutch device 16 which acts in one direction of rotation.

Another feature of the invention resides broadly in the drive hub characterized by the fact that the clutch device 16 can be actuated during reversal while the brake is in operation.

Yet another feature of the invention resides broadly in the drive hub characterized by the fact that the first planetary carrier 118 and the driver 7 are non-rotationally connected to one another.

Still another feature of the invention resides broadly in the drive hub characterized by the fact that the second ring gear 112 is connected to the first planetary carrier 118 by means of a clutch device 17 which acts only in one direction of rotation.

A further feature of the invention resides broadly in the drive hub characterized by the fact that the clutch device 17 can be actuated.

Types of transmissions for bicycles, and components thereof, which may be utilized in accordance with the embodiments of the present invention may be disclosed in the following U.S. Pat. Nos. 3,944,253 to Ripley on Mar. 16, 1976, entitled "Infinitely Variable Transmission for Pedal-Driven Vehicles"; 4,973,297 to Bergles on Nov. 27, 1990, entitled "Multispeed Drive Hub with More Than Three Speeds"; 4,721,015 to Hartmann on Jan. 26, 1988, entitled "Three Stage Planetary Driving Wheel for Pedal Powered Vehicles"; 4,063,469 to Bergles on Dec. 20, 1977, entitled "Multiple Speed Hub for a Vehicle Wheel"; 4,727,965 to Zach et al.; 4,721,013 to Steuer et al.; 4,651,853 to Bergles et al.; 4,628,769 to Nagano; and 4,400,999 to Steuer.

Types of devices and methods, which may be employed for forming various gearing components of the present invention, may be disclosed in the following U.S. Pat. Nos. 5,033,239 to Phillips on Jul. 23, 1991, entitled "Disposable Hob and Method of Grinding Same"; 4,750,848 to Adler on Jun. 14, 1988, entitled "Involute Gear Cutter"; and 4,663,721 to Herscovici on May 5, 1987, entitled "Gear Cutter".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 42 347.7, filed on Dec. 11, 1993, having inventor Gerhard Meier-Burkamp, and DE-OS P 43 42 347.7 and DE-PS P 43 42 347.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A multi-speed hub for a bicycle, the hub comprising:
    shaft means for being non-rotationally connected to a frame of a bicycle;
    input means for inputting rotational power to the hub;
    sleeve means disposed concentrically about said shaft means for outputting rotational power from the hub, said sleeve means comprising means for being connected to a wheel of a bicycle;
    transmission means disposed within said sleeve means about said shaft means, said transmission means comprising means for receiving the input rotational power of said input means and outputting the rotational power to said sleeve means;
    said transmission means comprising:
        first and second planetary gear mechanisms for receiving rotational input from said input means;
        said first planetary gear mechanism comprising:
            an input portion for being rotatably driven about said shaft means by said input means;
            an output portion for being driven by said input portion and for receiving the rotational power from said input portion and outputting the rotational power; and interconnecting means interconnecting said input portion and said output portion to transfer rotational power from said input portion of said output portion; said second planetary gear mechanism comprising:
an input portion for being rotatably driven about said shaft means by said input means;
an output portion for being driven by said input portion and for receiving the rotational power from said input portion and outputting the rotational power; and
interconnecting means interconnecting said input portion and said output portion to transfer rotational power from said input portion to said output portion;
a third planetary gear mechanism for receiving the output rotational power from said output portion of each of said first and second planetary gear mechanisms;
said third planetary gear mechanism comprising:
a first input portion for receiving the output rotational power from said output portion of said first planetary gear mechanism;
a second input portion for receiving the output rotational power from said output portion of said second planetary gear mechanism;
an output portion for receiving rotational power from said first and second input portions and outputting rotational power to said sleeve means;
interconnecting means interconnecting said output portion with both said first input portion and said second input portion to transfer rotational power from said both said first and second input portions to said output portion;
said interconnecting means of at least one of said first, second and third planetary gear mechanisms comprising means for varying a ratio of rotational power input to rotational power output; and
said hub further comprises means for selectively switching said means for varying to vary the ratio of rotational power input to rotational power output.

2. The multi-speed hub according to claim 1, wherein:
said third planetary gear mechanism comprises:
a sun gear disposed concentrically about said shaft means;
a ring gear disposed concentrically about said sun gear;
at least one planet gear disposed between and intermeshed with said sun gear and said ring gear; and
a planet carrier for mounting said at least one planet gear between said sun gear and said third ring gear;
said planet carrier comprises one of said first and second input portions of said third planetary gear mechanism;
one of said sun gear and said ring gear comprises the other of said first and second input portions of said third planetary gear mechanism; and
the other of said sun gear and said ring gear comprises the output of said third planetary gear mechanism.

3. The multi-speed hub according to claim 2, wherein:
said first planetary gear mechanism comprises:
a first sun gear disposed concentrically about said shaft means;
a first ring gear disposed concentrically about said first sun gear;
at least one first planet gear meshed with said first ring gear; and
a first planet gear carrier for disposing said at least one first planet gear in mesh with said first ring gear; said second planetary gear mechanism comprises:
a second sun gear disposed concentrically about said shaft means;
a second ring gear disposed concentrically about said second sun gear;
at least one second planet gear meshed with said second ring gear; and
a second planet gear carrier for disposing said at least one second planet gear in mesh with said second ring gear;
said output portion of said first planetary gear mechanism comprise one of said first ring gear and said first planet gear carrier;
said input portion of said first planetary gear mechanism comprise the other of said first ring gear, and said first planet gear carrier;
said output portion of said second planetary gear mechanism comprise one of said second ring gear, and said second planet gear carrier; and
said input portion of said second planetary gear mechanism comprise the other of said second ring gear, and said second planet gear carrier.

4. The multi-gear hub according to claim 3, wherein:
said sun gear of said third planetary gear mechanism comprises a third sun gear;
said ring gear of said third planetary gear mechanism comprises a third ring gear;
said at least one planet gear of said third planetary gear mechanism comprises at least one third planet gear; and
said planet carrier of said third planetary gear mechanism comprises a third planet carrier;
said third planet carrier comprises said first input portions of said third planetary gear mechanism;
said one of said sun gear and said ring gear comprises said second input portion of said third planetary gear mechanism;
said output portion of said first planetary gear mechanism comprise said first ring gear;
said input portion of said first planetary gear mechanism comprise said first planet gear carrier;
said output portion of said second planetary gear mechanism comprise said second ring gear; and
said input portion of said second planetary gear mechanism comprise said second planet gear carrier.

5. The multi-speed hub according to claim 4, wherein:
said input means comprises a drive pinion for being driven by a drive means of a bicycle;
said drive pinion comprising said first and second planet gear carriers of said first and second planetary gear mechanisms;
each said at least one first planet gear comprises a first multi-stage planet gear, each stage of each said first multi-stage planet gear comprising a different diameter;
said first planetary gear mechanism comprises a sun gear corresponding to each stage of said first multi-stage planet gear, each sun gear being disposed about said shaft means;
each said at least one second planet gear comprises a second multi-stage planet gear, each stage of each second multi-stage planet gear comprising a different diameter;
said second planetary gear mechanism comprises a sun gear corresponding to each stage of said first multi-stage planet gear, each sun gear being disposed about said shaft means; and said means for varying a ratio of rotational power input to rotational power output comprises means for selectively non-rotationally connecting and disconnecting at least one of said sun gears of said first and second planetary gear mechanism with said shaft means.

6. The multi-speed hub according to claim 5, wherein:

said first planetary gear mechanism comprises first clutch means for directly non-rotationally connecting said first planet carrier to said first ring gear, said first clutch means comprising means for being outrun by a selectively engaged one of said sun gears of said first planetary gear mechanism, said first clutch means operating in one direction of rotation of said first planet gear carrier;

said second planetary gear mechanism comprises clutch means for directly non-rotationally connecting said second planet gear carrier to said second ring gear, said second clutch means operating in a drive direction of rotation of said second planet gear carrier, said second clutch means being configured for being engaged and disengaged to engage and disengage said second ring carrier from said second ring gear; and said output portion of said third planetary gear mechanism further comprises clutch means for connecting said output one of said third sun gear and said third ring gear with said sleeve means to rotationally drive said sleeve means, said clutch means operating in a drive direction of rotation of said output portion.

7. The multi-speed hub according to claim 6, wherein:

said output portion of said third planetary gear system comprises said third ring gear;

said second input portion of said third planetary gear system comprises said third sun gear;

said second ring gear and said third sun gear comprise an integral, single-component piece;

said third planet gear carrier is non-rotationally connected to said first ring gear by a dog clutch;

said hub further comprises brake means disposed within said sleeve means;

said brake means comprising:
  a friction ring for frictionally engaging with said sleeve means; and
  means for pressing said sleeve means into frictional engagement with said sleeve means during a direction of rotation of said drive pinion opposite a drive direction of rotation; and said hub further comprises a first end piece for closing a first axial end of said hub between said shaft means and said sleeve means, and a second end piece for closing a second axial end of said hub between said shaft means and said drive pinion; and said first end piece comprises lever arm means for being fastened to a frame of a bicycle to non-rotationally brace said brake means within said sleeve means.

8. The multi-speed hub according to claim 6, wherein:

said output portion of said third planetary gear system comprises said third sun gear;

said second input portion of said third planetary gear system comprises said third ring gear;

said second ring gear and said third ring gear comprise an integral, single-component piece;

said third planet gear carrier comprises an integral, single component piece with said first ring gear;

said hub further comprises brake means disposed within said sleeve means;

said brake means comprising:
  a friction ring for frictionally engaging with said sleeve means; and
  means for pressing said sleeve means into frictional engagement with said sleeve means during a direction of rotation of said drive pinion opposite a drive direction of rotation; and said hub further comprises a first end piece for closing a first axial end of said hub between said shaft means and said sleeve means, and a second end piece for closing a second axial end of said hub between said shaft means and said drive pinion; and said first end piece comprises lever arm means for being fastened to a frame of a bicycle to non-rotationally brace said brake means within said sleeve means.

9. A method for mass-producing twelve-speed hubs for bicycles and mass assemblying bicycles having twelve speed hubs, said twelve speed hubs each comprising: shaft means for being non-rotationally connected to a frame of a bicycle; main input means for inputting rotational power to the hub; sleeve means disposed concentrically about said shaft means for outputting rotational power from the hub, said sleeve means comprising means for being connected to a wheel of a bicycle; transmission means disposed within said hub sleeve about said shaft means, said transmission means comprising means for receiving the input rotational power of said main input means and outputting the rotational power to said sleeve means; said transmission means comprising first, second and third planetary gear mechanisms for receiving rotational power from said main input means and outputting rotational power to said sleeve means; said first planetary gear mechanism comprising: first input means for receiving rotational power from said main input means, first output means for outputting rotational power, four selectable gear ratios between said first input means and said first output means, and means for selectively choosing one of said four selectable gear ratios; said second planetary gear mechanism comprising: second input means for receiving rotational power from said main input means, second output means for outputting rotational power, three selectable gear ratios between said second input means and said second output means, and means for selectively choosing one of said three selectable gear ratios; and said third planetary gear mechanism comprising: third input means for receiving rotational power from said first output means, fourth input means for receiving rotational power from said second output means, third output means for outputting rotational power to said sleeve means, and gear means interconnecting said said third and fourth input means and said third output means; and said method for mass-producing hubs comprising the steps of:

providing a plurality of shaft means;

providing a plurality of sleeve means;

providing a plurality of main input means;

providing a plurality of transmission means;

said providing a plurality of said transmission means comprising, for each said hub, the steps of:
  providing said first planetary gear mechanism having said four selectable gear ratios;
  disposing said first planetary gear mechanism about said axle;
  connecting said first input means of said first planetary gear mechanism to said main input means;
  providing said second planetary gear mechanism having said three selectable gear ratios;

disposing said second planetary gear mechanism about said axle;

connecting said second input means of said second planetary gear mechanism to said main input means;

providing said third planetary gear mechanism;

disposing said third planetary gear mechanism about said axle;

connecting said third input means of said third planetary gear mechanism to said first output means of said first planetary gear mechanism; and connecting said fourth input means of said third planetary gear mechanism to said second output means of said second planetary gear mechanism;

mass-assembling one said sleeve means concentrically about each said transmission means;

mass assembling said third output means of said third planetary gear mechanism with said sleeve means to form assembled hubs;

providing a plurality of wheel rim means;

mass assembling one wheel rim means to each said sleeve means of each assembled hub;

providing a plurality of bicycle frames;

mass assembling one assembled hub to each said bicycle frame by connecting said shaft means to said bicycle frame;

providing a plurality of said means for selective choosing ones of said gear ratios; and mass assembling at least one of said means for selectively choosing to each said bicycle frame.

* * * * *

UNITED STATES PATENT AND TRADEMARK OFFICE
CERTIFICATE OF CORRECTION

PATENT NO. : 5,527,230
DATED : June 18, 1996
INVENTOR(S) : Gerhard MEIER-BURKAMP It is certified that error appears in the above-indentified patent and that said Letters Patent is hereby corrected as shown below:

In column 5, line 47, after 'carrier', delete "1," and insert --18,--.

In column 6, line 18, after 'selectively', delete "actuating" and insert --activating--.

In column 11, line 15, after 'carrier', delete "1," and insert --18,--.

In column 14, line 51, after 'This', delete "panel" and insert --pawl--.

Signed and Sealed this

Seventeenth Day of December, 1996

Attest:

BRUCE LEHMAN

*Attesting Officer*    *Commissioner of Patents and Trademarks*